United States Patent [19]

Schnabel

[11] 4,224,961
[45] Sep. 30, 1980

[54] TUBULAR ELEMENT FOR PASSING FLOWABLE MEDIA

[76] Inventor: Ernst Schnabel, Postfach 354, 6250 Limburg, Fed. Rep. of Germany

[21] Appl. No.: 899,175

[22] Filed: Apr. 24, 1978

[30] Foreign Application Priority Data

Jan. 11, 1978 [DE] Fed. Rep. of Germany ... 007133[U]

[51] Int. Cl.$^3$ ............................................. F16K 15/04
[52] U.S. Cl. .................................. 137/375; 137/533.11
[58] Field of Search ................ 137/375, 519.5, 533.11, 137/533.13, 533.15

[56] References Cited

U.S. PATENT DOCUMENTS

| 1,279,599 | 9/1918 | Slaughter | 137/533.15 |
| 2,202,735 | 5/1940 | Johnson | 137/375 |
| 3,181,555 | 5/1965 | Jacobson | 137/375 |
| 3,498,315 | 3/1970 | Graves | 137/375 |
| 3,534,767 | 10/1970 | Swinney | 137/375 |

FOREIGN PATENT DOCUMENTS

| 943120 | 3/1974 | Canada | 137/375 |
| 1301426 | 7/1962 | France | 137/519.5 |

Primary Examiner—Robert G. Nilson
Attorney, Agent, or Firm—Michael J. Striker

[57] ABSTRACT

A tubular element for passing flowable media, particularly chemically aggressive media, has a tubular member bounding an inner passage, a synthetic plastic lining cladding the member within the passage, and means for supporting a member which is to be movably accommodated in the passage. The supporting means includes a plurality of portions of the synthetic plastic lining projecting transversely of the passage from circumferentially spaced locations of the same. At least some of the portions are axially aligned with one another in transverse direction of the passage. Three such portions may be provided in the tubular element. The tubular element may have means for reinforcing the portions of the lining, which may be formed as a plurality of shaped inserts supported on the tubular member and operative for backing the portions of the lining. The inserts may be ceramic, metallic or may be constituted by a synthetic plastic material hardened in hollows between the projecting portions and the tubular member.

10 Claims, 3 Drawing Figures

TUBULAR ELEMENT FOR PASSING FLOWABLE MEDIA

BACKGROUND OF THE INVENTION

The present invention relates to a tubular element for passing flowable media, particularly chemically aggressive media.

Tubular elements for passing chemically aggressive media, such as pipes, valves and the like, have been proposed in the art. The known tubular elements are constituted by pressure resisting inexpensive metal, and generally are completely coated by a corrosion resisting cladding. Polytetrafluoroethylene is utilized for this cladding in many cases. It has been known to provide tubular body for such valves and to connect tubular sections with one another by means of flanges provided therein. In such a construction sleeves of synthetic plastic material which form the cladding have flanges which are axially pressed toward one another so as to form a sealed structure.

It has been also known to flange a cladding sleeve over a ball-shaped inner circumferential surface of a flange-shaped metal ring so as to form a valve seat for a valve member, which is constituted of a synthetic plastic material or is coated by the latter.

In a known check valve it is necessary to hold the valve member in the open position in which the valve member is lifted from the valve seat in a direction of passing of flowable media. A sufficient flow cross-section must be available through which the flowable medium can laterally pass the valve member when the latter is located in the open position. For this purpose, a ball-shaped spacer of polytetrafluoroethylene has been provided having fixing flanges at both its sides, between which flanges the spacer is supported by a splitted metallic ring. This spacer has a through opening which converges away from the valve seat up to a ball-shaped projection, and four additional axial openings are provided which are spaced from one another by an angular distance equal to 90°, and are arranged substantially outwardly of the central through opening so as to form a lateral flow cross section which is necessary in the open position of the valve member. The manufacture of such a spacer which is formed from a block of polytetrafluoroethylene, is complicated and expensive.

SUMMARY OF THE INVENTION

Accordingly, it is an object of the present invention to provide a tubular element for passing flowable media particularly chemically aggressive media, which avoids the disadvantages of the prior art.

More particularly, it is an object of the present invention to provide a tubular element for passing flowable media, having supporting means which can be simply and inexpensively manufactured, and which form an axial stop for a movable member and assure a sufficient flow cross section without substantial radial bulging.

Another feature of the present invention is to provide a tubular element which possesses the abovementioned characteristics, and at the same time has a construction which is sufficiently stable and protected from corrosive action of the flowing media.

In keeping with these objects, and with others which will become apparent hereinafter, one feature of the present invention, briefly stated resides in a tubular element having a tubular member bounding an inner passage, a synthetic plastic lining cladding the member within the passage, and means for supporting a member which is to be movable accommodated in the passage, wherein this means comprises a plurality of portions of the synthetic plastic lining projecting transversely of said passage from circumferentially spaced locations of the same, and at least some of these portions are axially aligned with one another in transverse direction of the passage.

In such a construction a separate spacer of a synthetic plastic material of polytetrafluoroethylene is not needed, inasmuch as the above-mentioned portions project inwardly from the tubular member and transversely of the passage thereof so as to form a support for a movable member or a valve member of a check valve, because an inner diameter of the portions is such that they transversely overlap the diameter of the valve member. The transversely projecting portions are formed without great expenditures by the synthetic plastic lining of the tubular member. These portions reduce the flow cross section only to a small extent inasmuch as the lining in the circumferential direction remains between the portions on the inner circumference of the tubular member. For this reason in order to provide the support only a relatively small increase of the diameter of the tubular element is needed. Moreover, the through passage of the tubular element remains protected against the flowable media by synthetic plastic lining so that no difficulties are encountered for passing chemically aggressive media through the metallic tubular element.

Another feature of this invention is that reinforcing means is provided which is supported on the tubular member and is operative for supporting the projecting portions of the lining. In such a case, when not massive projecting portions are utilized hollow spaces between the synthetic plastic lining and the metallic member are eliminated, and it is guaranteed that with the synthetic plastic lining having a small thickness the projecting portions retain their shape and satisfactorily perform their functions. At the same time the shaped inserts which form the above-mentioned reinforcing means have the advantage that they impart an exact shape to the projecting portions.

Still another feature of the present invention is that the shaped inserts forming the reinforcing means may be constituted by ceramic or metal.

A further advantageous feature of the present invention is that the shaped inserts between the tubular metallic member and the projecting portions of the synthetic plastic lining are constituted by a hardenable synthetic plastic material. The hollow spaces or recesses formed on the inner circumference of the inner metallic member below the projecting portions of the lining can be filled with this material.

A still further feature of the present invention is that the projecting portions of the synthetic plastic lining are shaped over a web provided in the metallic member. It has been proposed in manufacture of the check valves to mount a metallic web on the inner circumference of a metallic housing, which web serves for supporting the valve member. However, such known webs have not been coated by a synthetic plastic material. When in the present construction the web is cladded by a synthetic plastic material such as polytetrafluoroethylene, it is not necessary to secure the web either by glue or by welding.

An additional feature of the present invention is that the projecting portions of the synthetic plastic lining are stream-lined as considered in longitudinal direction of the passage, and are V-shaped as considered in transverse direction of the passage. Such construction guarantees a smooth passage of the flowable media through the tubular element and assures that a valve member under the action of the passing media is centered within the tubular element by the projecting portions of the lining.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
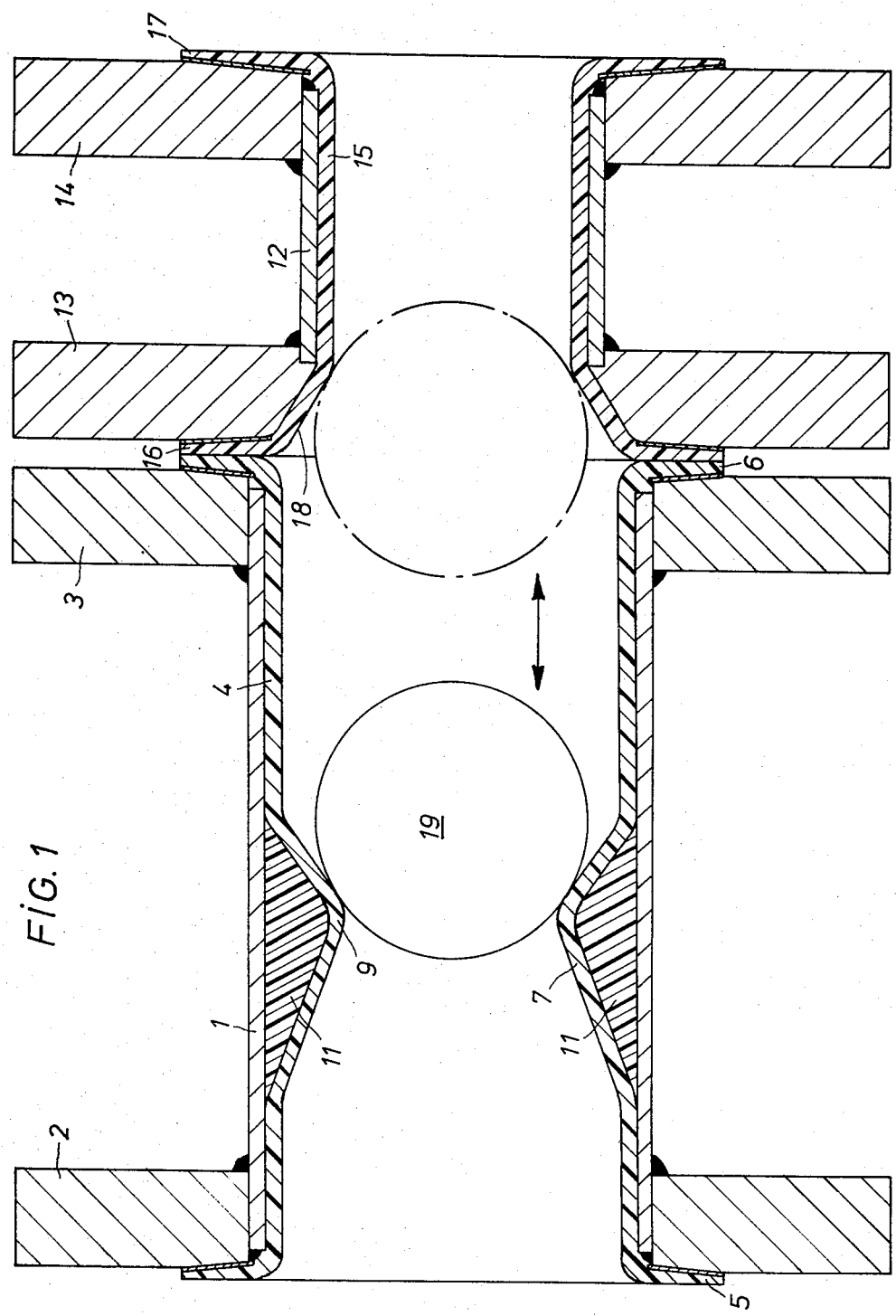
FIG. 1 is a view showing an axial section of a check valve having transversely projecting portions of a synthetic plastic lining in accordance with the present invention.

FIG. 1 shows a tubular element in accordance with the present invention. The tubular element has a metallic tubular member 1 with two flanges 2 and 3 which are welded to the tubular member 1. The tubular member 1 is provided with a synthetic plastic lining 4 which preferably is constituted by polytetrafluoroethylene. The end portions of the synthetic plastic lining 4 are flanged and form end flanges 5 and 6 which, while interposing thin supporting rings, are shaped on beveled faces of the flanges 2 and 3.

Figure 2:
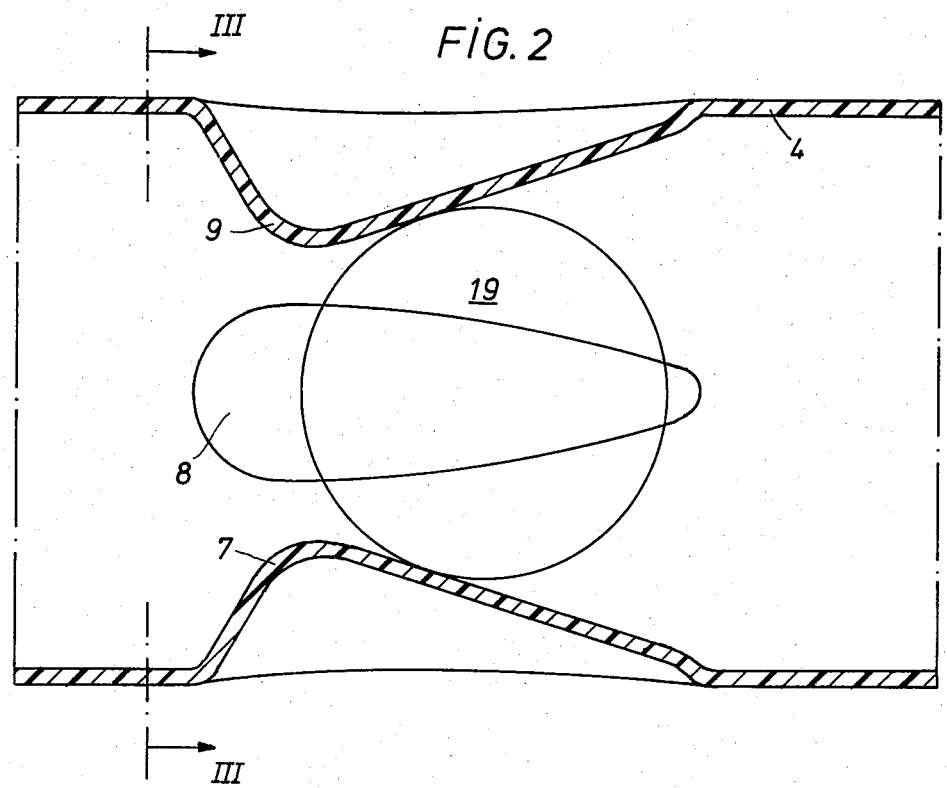
FIG. 2 is a view showing an axial section of the synthetic plastic lining in the region of the projecting portions thereof, wherein the projecting portions have a shape which is somewhat different as compared with the shape of the projecting portions shown in FIG. 1.
Figure 3:
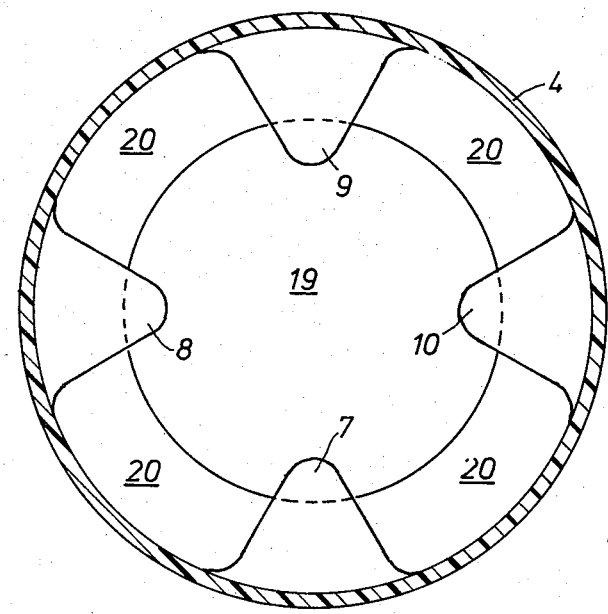
FIG. 3 is a view showing a section taken on the line 3—3 in FIG. 2.

The synthetic plastic lining 4 lies on the inner circumference of the metallic tubular member 1 and its shape corresponds to a cylindrical inner surface of the latter. However, the lining has four portions 7, 8, 9 and 10 which project transversely of a passage bounded by the tubular member 1. Only two portions 7 and 9 are shown in FIG. 1, whereas FIG. 2 shows three portions and FIG. 3 shows all four portions of the synthetic plastic lining. The projecting portions are spaced from one another in the circumferential direction and respective projecting portions are axially aligned with one another in transverse direction of the passage. The projecting portions 7-10 are so shaped that respective sections of the synthetic plastic lining 4 projects radially inwardly of the tubular member 1. The projecting portions 7-10 are not solid, but, instead, are substantially thin so as to form together with the tubular member 1 hollows or recesses. In the hollows formed between the projecting portions 7-10 of the synthetic plastic lining 4 and the metallic tubular member 1, shaped inserts 11 are located. The shaped inserts 11 reinforce the projecting portions 7-10 of polytetrafluoroethylene and prevent the possibility that the latter will have unsufficient shape stability. The shaped inserts 11 may be constituted by metal or ceramic, as well as by a synthetic plastic material. In the latter case, the synthetic plastic material may be filled into the hollows formed between the projecting portions 7-10 of the lining 4 and the metallic tubular member 1 and hardened therein.

In order to form a check valve the metallic tubular member 1 is connected with an additional metallic tubular member 12 having a smaller axial length and a smaller diameter, as shown in FIG. 1. The tubular member 12 is also provided with flanges 13 and 14. It is cladded by a cylindrical sleeve 15 of polytetrafluoroethylene, whose end sections are flanged so as to form end flanges 16 and 17. The flange 13 has a small bevel in the region of the end flange 16 and a big bevel on the inner circumference thereof. A portion 18 of the sleeve 15 is shaped on the big bevel of the flange 13, so as to form a valve seat for a valve member 19 of a check valve.

FIG. 1 shows the valve member 19 in an open position in which it abuts against the projecting portions 7-10 of the synthetic plastic lining 4. Dotted lines show the valve member 19 in a closed position in which the valve member 19 abuts against the portion 18 or the valve seat and prevents back-flow which is opposite to normal direction of flow of the flowable media (from right to left in FIG. 1). Displacement of the valve member 19 under the action of the flow of the flowable media is identified in FIG. 1 by double arrow.

As shown in FIG. 1, the tubular members 1 and 12 are axially aligned and connected with one another by means of end flanges 6 and 16 sealingly secured to one another. Connecting bolts can be utilized for this purpose. These bolts are not shown in the drawing; however, the diameter of the flanges 2, 3, 13, and 14 whereat holes for such bolts lie, is shown in FIG. 1.

As can be seen from FIG. 2 the projecting portions 7-10 of the synthetic plastic lining 4 are stream-lined as considered in the direction of flow of the flowable media or in the longitudinal direction of the passage. The distance between the opposite projecting portions reduces to the point at which the projecting portions project inwardly to the greatest extent. Due to such a construction the valve member 19 is centered in the open position between the projections 7-10.

As can be seen from FIG. 3, the projecting portions 7-10 are substantially V-shaped as considered in a transverse section or in a radial section. They are considerable spaced from one another in their circumferential direction. Thereby, four through passages 20 are formed between the projecting portions 7-10 so that when the valve member 19 is located in its open position the flowable media can pass through the thus-formed through passages 20. A diameter of the valve member 19 is somewhat smaller than an inner diameter of the cylindrical synthetic plastic lining 4, but is somewhat greater than a cylindrical inner diameter of the sleeve 15 and then a diameter bounded by the tips of the projections 7-10.

It is understood that only three such projecting portions may be provided in the tubular element, which are spaced in the circumferential direction of the latter. The projecting portions may have another shape in the axial section as compared with that shown in FIG. 3. For example, the radially inwardly projecting portions may be formed as supporting elements for screens, plates and the like which have a diameter corresponding to the inner diameter of the synthetic plastic lining and thereby do not require centering by means of the projecting portions. In this case the projecting portions may abruptly project radially inwardly by a small distance so as to form axially directed supporting faces, and it is advantageous when webs are arranged on the metallic tubular member beneath the synthetic plastic lining.

It will be understood that each of the elements described above, or two or more together, may also find a useful application in other types of constructions, differing from the types described above.

While the invention has been illustrated and described as embodied in a tubular element for passing flowable media, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A tubular element for passing flowable media, particularly chemically aggressive media, comprising a tubular member bounding an inner passage and having an axis; a synthetic plastic lining cladding said tubular member within said passage and including a plurality of portions which are offset radially inwardly of said inner passage from axially identical and circumferentially spaced locations of the same, so as to support a member which is to be movably accommodated in said inner passage and to form a plurality of hollows between said offset portions of said lining and said tubular member; and a plurality of shaped inserts which are separate from said tubular member and each located in a respective one of said hollows, so as to radially back a respective one of said offset portions of said lining to thereby reinforce the same.

2. The tubular element as defined in claim 1, wherein said movable member is a valve member of a check valve, said tubular member forming a valve body, and said portions together forming a support for retaining said valve member in an open position of the check valve.

3. The tubular element as defined in claim 1, wherein said lining includes three such portions.

4. The tubular element as defined in claim 1, wherein said tubular member is metallic.

5. The tubular element as defined in claim 1, wherein said shaped inserts are constituted of ceramic.

6. The tubular element as defined in claim 1, wherein said shaped inserts are constituted of metal.

7. The tubular element as defined in claim 1, wherein said portions are streamlined as considered in an axial direction of said passage.

8. The tubular element as defined in claim 1, wherein each of said portions is V-shaped as considered in a radial direction of said passage.

9. The tubular element as defined in claim 1, wherein said tubular member is cylindrical, said lining being also cylindrical with the exception of the region wherein said offset portions are provided.

10. The tubular element as defined in claim 1, wherein said inserts are constituted of a synthetic plastic material hardened in said hollows.

* * * * *